UNITED STATES PATENT OFFICE.

NIVEN McCONNELL, OF MUNHALL, PENNSYLVANIA.

CHROME-BRICK.

SPECIFICATION forming part of Letters Patent No. 582,942, dated May 18, 1897.

Application filed July 8, 1896. Serial No. 598,493. (No specimens.)

*To all whom it may concern:*

Be it known that I, NIVEN McCONNELL, of Munhall, in the county of Allegheny and State of Pennsylvania, have invented a new and useful Improvement in Chrome-Bricks, of which the following is a full, clear, and exact description.

My invention relates to the manufacture of refractory bricks containing chrome, and is designed to afford a new composition for such bricks whereby a much stronger and less friable article is obtained than has heretofore been possible. These bricks, as heretofore, with a binder of tar or similar material, have been very friable and easily broken, and are short-lived when used in open-hearth furnaces and similar locations. I have discovered that by adding a small percentage of alkali matter to the chrome ore a composition is given which, when burned, becomes very hard and durable and can be sold and handled in the market as a finished brick which is not liable to disintegrate under the influence of weather, nor otherwise to spoil. This has not heretofore been done, as far as I am aware, in the manufacture of chrome-bricks. I have discovered that the essential element of the invention is the presence of only a small percentage of alkaline matter, preferably two per cent. of lime, and not more than three per cent.

In carrying out my invention I grind up the chrome ore and add thereto a small percentage of milk of lime, enough to give, say, two per cent. of lime in the brick. The mixture is then burned, giving a durable and non-friable article. It will be readily understood that alkali matter other than lime may be employed, and that other materials may be added to the mixture without departing from my invention; since

I claim—

A burned brick composed of a mixture of chrome ore and about two per cent., not more than three per cent., of alkali binding material.

In testimony whereof I have hereunto set my hand.

NIVEN McCONNELL.

Witnesses:
G. I. HOLDSHIP,
C. BYRNES.